United States Patent
Noldus

(10) Patent No.: US 8,811,276 B2
(45) Date of Patent: Aug. 19, 2014

(54) METHOD OF AND AN ARRANGEMENT FOR CALL ESTABLISHMENT BETWEEN AN INTERNET COMMUNICATION ENVIRONMENT AND A MOBILE COMMUNICATION ENVIRONMENT

(75) Inventor: Rogier Noldus, BM Goirle (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 186 days.

(21) Appl. No.: 12/747,897

(22) PCT Filed: Dec. 14, 2007

(86) PCT No.: PCT/EP2007/010992
§ 371 (c)(1),
(2), (4) Date: Jun. 22, 2010

(87) PCT Pub. No.: WO2009/076971
PCT Pub. Date: Jun. 25, 2009

(65) Prior Publication Data
US 2010/0290394 A1 Nov. 18, 2010

(51) Int. Cl.
*H04W 4/00* (2009.01)
(52) U.S. Cl.
USPC .......................................................... 370/328
(58) Field of Classification Search
USPC .......................................... 370/328, 338, 352
See application file for complete search history.

(56) References Cited

U.S. PATENT DOCUMENTS

| | | | |
|---|---|---|---|
| 6,636,504 B1 | 10/2003 | Albers et al. | |
| 7,839,990 B2* | 11/2010 | Lee | 379/207.16 |
| 2001/0034224 A1* | 10/2001 | McDowell et al. | 455/412 |
| 2004/0052225 A1* | 3/2004 | Lundstrom | 370/329 |
| 2004/0106399 A1* | 6/2004 | Ki | 455/422.1 |
| 2005/0147085 A1* | 7/2005 | Eguchi et al. | 370/352 |
| 2005/0272438 A1* | 12/2005 | Holur et al. | 455/452.2 |
| 2006/0211411 A1* | 9/2006 | Haaramo et al. | 455/414.1 |
| 2008/0274715 A1* | 11/2008 | Heit et al. | 455/406 |

FOREIGN PATENT DOCUMENTS

CN 101047750 A 10/2007

OTHER PUBLICATIONS

Liao, W. et al. "VoIP Mobility in IP/Cellular Network Internetworking." IEEE Communications Magazine, Apr. 2000, pp. 70-75.

* cited by examiner

*Primary Examiner* — Mark Rinehart
*Assistant Examiner* — Mohammad Anwar
(74) *Attorney, Agent, or Firm* — Coats & Bennett, PLLC

(57) ABSTRACT

A method of and an arrangement for call establishment between user equipment (1) operating as a dient in an internet communication environment (4), and user equipment (2, 3) operating as a dient in a mobile communication environment (5). The mobile communication user equipment (2, 3) is emulated as a dient in the internet communication environment (4). A Status of the mobile communication user equipment (2, 3) is represented in the internet communication environment (4). Calls are established with the mobile communication user equipment (2, 3) operating as a dient in the internet communication environment (4).

22 Claims, 6 Drawing Sheets

METHOD OF AND AN ARRANGEMENT FOR CALL ESTABLISHMENT BETWEEN AN INTERNET COMMUNICATION ENVIRONMENT AND A MOBILE COMMUNICATION ENVIRONMENT

FIELD OF THE INVENTION

The present invention relates to telecommunications and, more particularly, to call establishment between user equipment operating as a client in an internet based communication environment, hereinafter also called internet communication user or user equipment, and user equipment operating as a client in a mobile communication environment, hereinafter also called mobile communication user or user equipment.

BACKGROUND OF THE INVENTION

Since the introduction of the first computer networks and in particular with the advent of the internet, voice communication over computer data networks has been a subject of interest. One of the major challenges of real time communication over data packet networks is to ensure that the data packets are delivered in sequential order.

Technology for transmitting voice conversations over the internet has been available to end users since at least the 1990's, and is generally called after its communication protocol Voice over Internet Protocol or VoIP. VoIP is operated as a client-server model.

At the start of VoIP, voice communication was limited to users of the internet. No connection to the POTS (Plain Old Telephony Services) system was offered. Some telecommunication equipment manufacturers offered "dual mode" telephone sets capable of delivering mobile VoIP.

Other communication protocols developed for voice communication over the internet by computers operate on a peer-to-peer model, rather than the more traditional client-server model. A user directory of these internet communication systems is substantially decentralized and distributed among the nodes in the network, which means that these networks can scale very easily to large sizes without a complex and costly centralized infrastructure.

Telephone calls between users of an internet communication system are in general free of charge, apart from a fee to an Internet Service Provider (ISP). To contact users outside the internet communication system, a subscription is available for internet users for placing calls to traditional telephone devices, including mobile telephones, for a fee. Internet users may also subscribe to receive calls on their computers or internet connected telephones, dialled by regular telephone subscribers to a local telephone number through which access to a user of the internet communication system is provided. A user of the internet communication system in Australia, for example, may subscribe to a local telephone number in Finland. Callers of Finland would only pay local or national rates to call that number.

Telecommunication operators and consumers have invested substantially in mobile telephone equipment. In developed countries, mobile telephones have achieved nearly complete market penetration, and many people are giving up landlines and using mobile equipment exclusively. On the other hand, due to the possibility of making phone calls free of charge, internet communication systems have gained increased interest of the public.

In view of these developments, there is a growing need for users of mobile communication systems and users of internet communication systems to contact each other while keeping the best of both worlds, i.e. mobility and ease of use of a mobile telephone and establishing and receiving calls as a regular internet communication user, respectively.

Most, if not all, of commercially available products may require hardware to be installed at home, may require the use of an additional SIM (Subscriber Identity Module) card or may require that hardware is connected to a Personal Computer (PC) which permanently needs to be switched on for establishing the required communication.

US patent application 2001/0034224 (McDowell et al.), discloses a system and method for sharing user event information among wireless devices and those connected to fixed IP networks, such as the Internet. Mobile user event information is to be understood as to mean information regarding the presence of a wireless or mobile device on its associated network. This event information is provided to the users of the IP network by a Mobile Event Server (MES) connecting to the mobile network and the IP network. The MES broadcasts event information to instant messaging services which in turn send the appropriate notification to instant messaging subscribers.

The instant messaging communication disclosed is a notification system and method, notifying subscribers of the presence of a wireless or mobile device such that a user in the IP network can send messages or place calls to the wireless or mobile user with a high level of confidence that the messages are being received in near real time.

An article by Liao, et al., "VoIP Mobility in IP/Cellular Network Internetworking", elaborates on call set-up procedures between users of an IP network and cellular or mobile users. In particular, the applicability of H.323 signalling for supporting call establishment between an IP network user and a roaming cellular network user is discussed.

It appears that existing H.323 signalling is inadequate to cope with roaming mobile users. As a solution to this problem, the authors of this publication discuss to store in the HLR/VLR of the mobile user gateway identification associated with a registered mobile terminal. From this gateway identification information can be derived whether a mobile terminal is roaming from the location area associated with a different gateway, and hence to launch a handoff, if necessary.

U.S. Pat. No. 6,636,504 (Verizon Services Corp.), provides an arrangement for enabling reverse billing for Internet telephony calls. Reverse billing is to be understood that a called subscriber is charged for the costs of a telephone call between Internet and Plain Old Telephone Service (POTS) subscribers, for example.

SUMMARY OF THE INVENTION

It is an object of the present invention to provide a method of and equipment for establishing, i.e. placing and receiving calls between user equipment of an internet communication system and user equipment of a mobile communication system, not requiring additional hardware or hardware modifications to the user equipment and with minimal impact to existing call establishment procedures.

These and other objects are provided, in a first aspect of the invention, by a method of call establishment between user equipment operating as a client in an internet communication environment, and user equipment operating as a client in a mobile communication environment, comprising the steps of:
  emulating the mobile communication user equipment as a client in the internet communication environment,
  representing a status of the mobile communication user equipment in the internet communication environment, and establishing a call with the mobile communication user equipment as a client in the internet communication environment.

The concept of the present invention is that mobile communication user equipment operating in a mobile communication environment, such as but not limited to a GSM (Global System for Mobile communications) communication environment, a UMTS (Universal Mobile Telecommunications System) communication environment, and environments where GSM or UMTS are applied in a UMA (Unlicensed Mobile Access) communication domain or in a Home base station domain, will be "visible" as a regular client in the internet communication environment or system. This facilitates that internet communication users may place or receive a voice call or a video call to or from mobile communication users without special subscriptions as disclosed above. Hence an internet communication user may contact a mobile communication user just as contacting another internet communication user.

In an example of the invention, the mobile communication user equipment is provided with an internet communication identity adapted for regular identification in the internet communication environment, such as, for example, John_Smith. Binding is maintained between this internet communication identity and a mobile communication identity of the mobile communication user equipment used for identification in the mobile communication environment. As such, the mobile communication user equipment or user is known in the internet communication environment as a regular internet communication user, including a regular internet communication user name. Accordingly, an internet communication user may contact the mobile communication user using the internet communication identity, such as John_Smith, and does not have to know that the other party, who is visible as a regular internet communication user, has a mobile telephone equipment operating in a regular mobile communication environment or system.

However, according to the invention, in a further example thereof, the status representation may comprise an indication that the user equipment is a mobile communication user equipment. The mobile communication user may indicate, when becoming an internet communication user according to the invention, whether he or she wants to reflect being a mobile communication user, such as John_Smith_mobile, rather than a PC-bound internet communication user.

This feature may be advantageous, for example, when the mobile communication user, acting as an internet communication user, also is a regular internet communication user. Hence, he or she may be represented on the internet (1) as a regular internet communication user such as John_Smith_ home, where home indicates that he or she is reachable on a PC based VOIP application, for example, and (2) as an internet communication user, reachable on a mobile communication device (John_Smith_mobile). This feature may further be advantageous when there are costs associated with calling the internet communication user when that internet communication user is reachable on a mobile communication device.

In a yet further example of the invention, the status representation comprises call availability representation of the mobile communication user equipment in the mobile communication environment. Herewith, a mechanism is provided by which the availability status of the mobile communication user equipment in the internet communication environment is "synchronised" with the availability status of the mobile communication user equipment in the mobile communication environment. In other words, when the mobile telephone equipment of a user is switched on (or "attached"), then that user is reachable and hence will be marked as "available" in the internet communication environment. When the mobile telephone equipment of a user is switched off (or "detached"), then that user is not reachable and hence will be marked as "unavailable" in the internet communication environment.

According to an example of the invention, calls in which the mobile communication user equipment operates as a client in the Internet communication environment are charged to the owner of the mobile communication user equipment.

According to another example of the invention, the status representation comprises geographical location information of the mobile communication user equipment in the mobile communication environment. As will be known to those skilled in the art, in a mobile communication environment, in particular a cellular mobile communication system, the geographic location of the mobile communication user equipment is known through the exchange of, for example, a cell global identifier (i.e. mobile country code, mobile network code, location area code, cell identifier), a location number (e.g. representing a location according the local landline numbering plan) and geographical coordinates. The geographical information provides an indication of the location where the mobile communication user equipment currently resides, such as registered in its home zone or registered through a Femto cell, for example. Rationale may be that when the mobile user is registered in his/her home zone, terminating calls to that mobile user will be charged at a lower rate, for example as equivalent local calls, or may be free of charge.

This location information is used to augment the user status representation in the internet communication environment by a 'location qualifier'. The location qualifier may, for example, consist of a text string providing an indication of the location where the user currently resides. For privacy reasons, the mobile communication user may indicate, when becoming an internet communication user, whether the location information is made visible to the users of the Internet communication environment.

In another example of the invention, call establishment is made dependent on the location of the mobile communication user equipment. With this feature, among others, a mobile communication user may avoid being charged for calls from internet communication users, for example, if the mobile communication user equipment has roamed to another mobile communication network, not being its home network, such as to a foreign network.

The invention further provides a method wherein the mobile communication user equipment receives an indication of a call setup request from user equipment operating as a client in the internet communication environment. This feature also provides the mobile communication user an option to take or refuse a call from the internet communication environment to avoid charges, for example.

In another example of the invention, the status representation is selectively adaptable contained in a mobile communication user equipment profile. Preferably, a mobile communication user has, at all times, access to the user profile for adapting the user profile for operation as a client in the internet communication environment.

In a further example of the invention, call establishment is enabled if a call setup request from mobile communication user equipment operating as a client in the mobile communication environment comprises an identity of user equipment operating as a client in the internet communication environment. That is, a mobile user may set up a call to an internet communication user by directly "dialling" the internet communication identity of the called user from the mobile communication user equipment.

In such case, the call established by the mobile communication user arrives at the internet communication user and is presented to this internet communication user as if the call were coming from another internet communication user. This method facilitates, for example, that the internet communication user, receiving the call from the mobile communication user, may call that mobile communication user back at a later stage, using normal call establishment methodology for calling another internet communication user.

This identity feature whereby the mobile communication user equipment operating as a client in the mobile communication environment directly "dials" the internet communication identity of the called user from the mobile communication user equipment, in a further example of the invention, is disabled if the destination internet communication user is a mobile communication user which is emulated as a client in the internet communication environment. Instead of setting up the call via the internet communication environment, call setup is established as a regular call setup in a mobile communication environment.

Those skilled in the art will appreciate that exchange of message calls, such as text or video messages, is very popular in today's mobile communication. According to the invention, in a still further example thereof, message calls from user equipment operating as a client in the internet communication environment to mobile communication user equipment emulated for operating as a client in the internet communication environment are delivered following a store-and-forward scheme.

In this manner, text and video messages are forwarded from internet communication user equipment within the regular internet communication environment to mobile communication user equipment, also when the mobile communication user equipment is currently not operating as a regular internet communication client, i.e. "unavailable" because the mobile communication user equipment is "detached". As soon as the mobile communication user equipment is registered and operating as an internet communication client, the message calls will be delivered.

Like the receipt of speech calls, for example, as disclosed above, the receipt of message calls may, for example, be enabled or disabled dependent on location of the mobile communication user. The availability of mobile communication user equipment for the receipt of message calls is, in an example of the invention, represented by a suitable status representation within the internet communication environment.

The method according to invention is suitable for any type of internet communication, such as VoIP or peer-to-peer internet communication systems like the so-called Skype™ communication environment, because the invention provides for conversion between the internet communication environment communication protocols and the mobile communication environment protocols, by emulating the mobile communication user equipment as a client in the internet communication environment.

In a second aspect, the invention provides an arrangement for call establishment between user equipment operating as a client in an internet communication environment and user equipment operating as a client in a mobile communication environment, the arrangement comprising:

emulation equipment for emulating the mobile communication user equipment as a client in the internet communication environment, status representation equipment for representing a status of the mobile communication user equipment in the internet communication environment, and call establishing equipment for establishing calls with the mobile communication user equipment as a client in the internet communication environment.

The arrangement of the invention, in a further example thereof, comprises user provisioning equipment for providing the mobile communication user equipment an internet communication identity adapted for identification in the internet communication environment and for binding the internet communication identity to a mobile communication identity of the mobile communication user equipment for identification in the mobile communication environment.

The status representation equipment, in another example of the invention, is arranged for providing in the internet communication environment at least one of:

an indication that the user equipment is a mobile communication user equipment, call availability of the mobile communication user equipment in the mobile communication environment, messaging capability of the mobile communication user equipment in the mobile communication environment, geographical location information of the mobile communication user equipment in the mobile communication environment, and cost indication, in the case that establishing a call to the mobile communication user equipment operating as a client in the mobile communication environment, would incur costs for the internet communication user.

In an example of the arrangement according to the invention, the status representation equipment is arranged for visually representing the status on a display of the internet communication user equipment. Such as on the screen of a PC or on the display of a mobile communication device having internet communication capability, such as VoIP, for example.

According to the invention, the call establishing equipment, in a further example thereof, is arranged for call establishment dependent on mobile communication user equipment location. Further, the call establishing equipment is arranged for enabling calls from mobile communication user equipment operating as a client in the mobile communication environment at receipt of a call setup request comprising an identity of user equipment operating as a client in the internet communication environment.

In a yet further example of the invention, the call establishing equipment is arranged for ensuring that when a voice or video call or a message call is established between two mobile communication users, both being represented as internet communication user, the call establishment does not traverse the internet communication environment.

The arrangement according to the invention further comprises charging equipment for charging of a call in which the mobile communication user equipment operates as a client in the internet communication environment to the owner of the mobile communication user equipment.

Among others to provide a mobile communication user the opportunity to accept or refuse calls from internet communication user equipment, the arrangement according to the invention comprises indicating equipment for indicating to the mobile communication user equipment a call setup request from user equipment operating as a client in the internet communication environment.

To place message calls to mobile communication users operating as a client in the internet communication environment, also when the mobile communication user equipment is unavailable, in a further example of the arrangement according to the invention, the call establishing equipment further comprises message handling equipment for handling message calls from internet communication user equipment to mobile communication user equipment emulated for operating as a client in the internet communication environment following a store-and-forward scheme.

In an example of the invention, the arrangement is comprised in a communication gateway operatively connected to the Internet communication environment and the mobile communication environment. The gateway resides on the edge between the mobile communication environment or network and the public internet.

The invention, in a third aspect thereof, provides a communication gateway equipped for exchanging communication data and signalling data between an internet communication environment and a mobile communication environment, comprising any of the arrangement disclosed above. The communication gateway, in a further example thereof, comprises a computer and computer program having program code means, which computer program functions to carry out the method of the invention as disclosed above, when the computer program is loaded in a working memory of the computer and is executed by the computer.

In a fourth aspect, the invention relates to a mobile communication system, comprising such a communication gateway. That is, the communication gateway is controlled and operated by a mobile network operator.

In a fifth aspect, the invention relates to an internet communication system, comprising such a communication gateway. That is, the communication gateway is controlled and operated by an operator of the internet communication system.

In a sixth aspect, the invention provides user equipment, arranged for establishing calls with an Internet communication environment, wherein the user equipment comprises a receiver and a display arranged for receiving and displaying status representation of mobile communication user equipment operating as a client in an internet communication environment.

As will be appreciated from the above, the present invention has the advantages that:
no hardware is required to be installed at the subscriber's or user's home,
no additional SIM card is needed by the mobile communication user, and
no connection to a PC (at home) is required which needs to be switched on.

The invention will now be further elucidated by an exemplary embodiment for call establishment between an internet communication system and a mobile communication system operating in accordance with the well known GSM communication standard. The invention is, however, neither restricted to nor limited by this exemplary embodiment. Those skilled in the art will be able to apply the teachings of the invention to other communication environments without having to apply inventive skills. In the drawings, like reference numerals refer to like elements or elements providing like functionality.

DETAILED DESCRIPTION OF EXEMPLARY EMBODIMENTS

Figure 1:
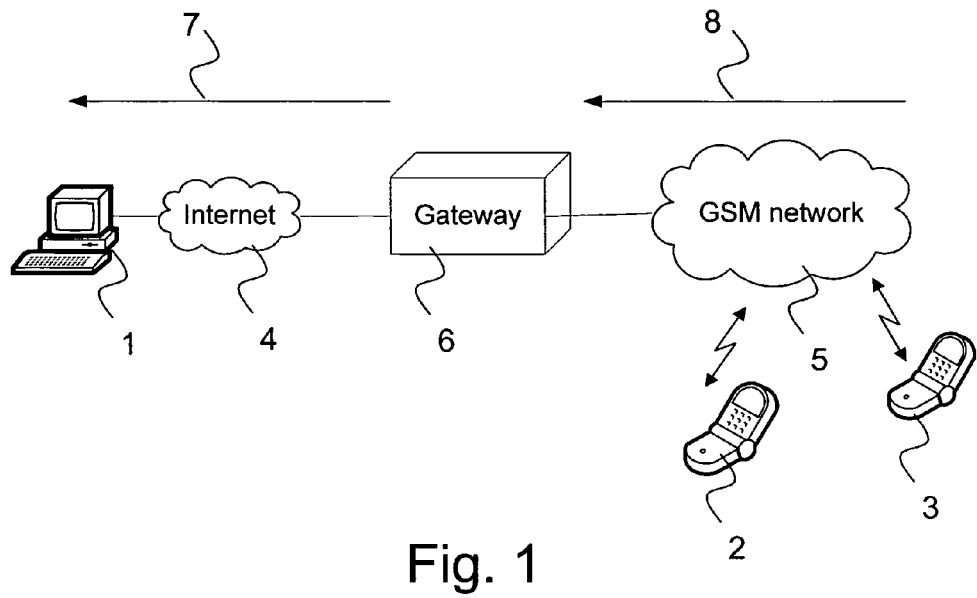
FIG. 1 shows, in a schematic manner, a general architecture of an example of an arrangement according to the invention.

FIG. 1 shows overall architectural view of an exemplary embodiment of the invention for communication between internet communication user equipment 1, shown in the form of a Personal Computer, and mobile communication user equipment 2, 3, shown as mobile telephones.

The internet communication user equipment 1 connects to the (public) internet 4 which provides for voice communication, and, in a more elaborated fashion, also for video and/or message calls between a plurality of internet users. In the present description the term internet and internet communication environment are used synonymously. For the sake of clarity, in FIG. 1 just a single internet communication user equipment 1 has been shown. The communication protocol used for internet voice communication may comprise a Voice over Internet Protocol (VoIP) or any other (proprietary) data packet communication protocol, including a peer-to-peer communication protocol, for example. Communication protocols of this type are known to the person skilled in the art, such that no further detailed explanation seems required.

The mobile communication user equipment 2, 3 may operate in any commercially available mobile or wireless communication environment or system 5, such as but not limited to a GSM (Global System for Mobile communications) communication environment, a UMTS (Universal Mobile telecommunications System) communication environment, a UMA (Unlicensed Mobile Access) communication environment wherein GSM or UMTS are applied, and a Home base system, for example. Likewise, mobile communication technology for use with the invention will be regarded known to the skilled person.

In the remainder of the present description, solely for the purpose of clarity, it will be assumed that the mobile communication environment 5 is a GSM network and that the wireless mobile communication user equipment 2 is a regular GSM mobile telephone. Because the invention places no requirements on the mobile communication user equipment, any 'black phone' or legacy user equipment may be used. The mobile communication user equipment 3 may be a GSM mobile telephone with UMA capability, for example. UMA facilitates access to the GSM network by using an unlicensed spectrum, such as a Wireless LAN or Bluetooth. It will be appreciated that for providing voice calls as well as video calls a user may also use a regular UMTS phone, for example.

The GSM network is a regular GSM network, including Mobility Management (MM) notifications. The GSM network generates notifications related to the status of the mobile communication user equipment, i.e. attached vs. detached.

In accordance with an exemplary embodiment of the invention, a communication gateway 6 is provided, which forms an interface between the GSM communication network 5 and the internet 4. The communication gateway 6 is generally expected to be controlled or operated by an operator of the GSM network 5. However, the communication gateway 6 may also be controlled or operated by an operator of the internet communication environment 4.

In accordance with the invention, the communication gateway 6 is essentially arranged for performing the following tasks:
- emulating the mobile communication user equipment 2, 3 as a client in the internet communication environment 4, schematically indicated by arrow 7 in FIG. 1,
- representing a status of the mobile communication user equipment 2, 3 in the internet communication environment 4, schematically indicated by arrow 8 in FIG. 1, and
- establishing calls with the mobile communication user equipment 2, 3 as a client in the internet communication environment 4.

That is, the communication gateway 6 handles the internet user emulation aspect, the GSM mobility aspect and the internet call establishment aspect, respectively. In particular, the communication gateway 6 is arranged to exchange call establishment related signalling information with the GSM network 5, such as ISDN User Part (ISUP) and non-call establishment related signalling, such as Mobile Application Part (MAP).

Through the communication gateway 6, the mobile communication user equipment 2, 3 is "visible" in the internet communication environment 4 as a regular internet communication client. Hereinafter also referred to as a mobile internet communication user. This facilitates that internet communication users may establish a voice call or a video call to the mobile communication user equipment 2, 3 operating in the GSM network 5. Thus, with the invention, the internet communication user equipment 1 does not need to subscribe to or has to use any facility or service for calling mobile communication user equipment by placing or receiving calls to or from a traditional telephone number, for example. Hence, the Internet communication user may use regular internet communication methodology to place a call to or to receive calls from the mobile communication user equipment 2, 3. In fact, the user establishing or receiving a call in the internet communication environment 4 does not have to realise that the called party, who is visible as a regular internet communication user, is receiving or placing the call from a GSM telephone, for example.

When a mobile communication user becomes a mobile internet communication user for receiving calls, he or she has to be provisioned in the communication gateway 6. In the GSM communication example, the provisioning equipment provides the communication gateway 6 with the MSISDN (Mobile Station Integrated Services Digital Network) number of the GSM user, i.e. a mobile communication identity, as well as an internet communication user name, e.g. John_Smith, i.e. an internet communication identity. The communication gateway 6 maintains binding between this MSISDN and the internet communication user name.

The communication gateway 6 emulates an internet client on behalf of the GSM user. As such, the GSM subscriber is known in the internet 4 as a regular internet communication user, including internet communication name, e.g. John_Smith. Internet communication user equipment 1 can establish a voice call towards John_Smith within the regular internet communication environment 4.

The invention provides a mechanism whereby the availability status of the emulated mobile communication user equipment 2, 3 in the internet communication environment 4 is synchronised with the status of the mobile communication user equipment 2, 3 in the GSM network 5. That is, when the mobile communication user equipment 2, 3 such as a GSM telephone of a user is switched on (attached), then that user or user equipment is reachable and hence will be marked as "available" in the internet communication environment 4. When the mobile communication user equipment 2, 3 is switched off (detached), then the user or user equipment is not reachable and hence will be marked as "unavailable" in the internet communication environment 4.

Figure 2:
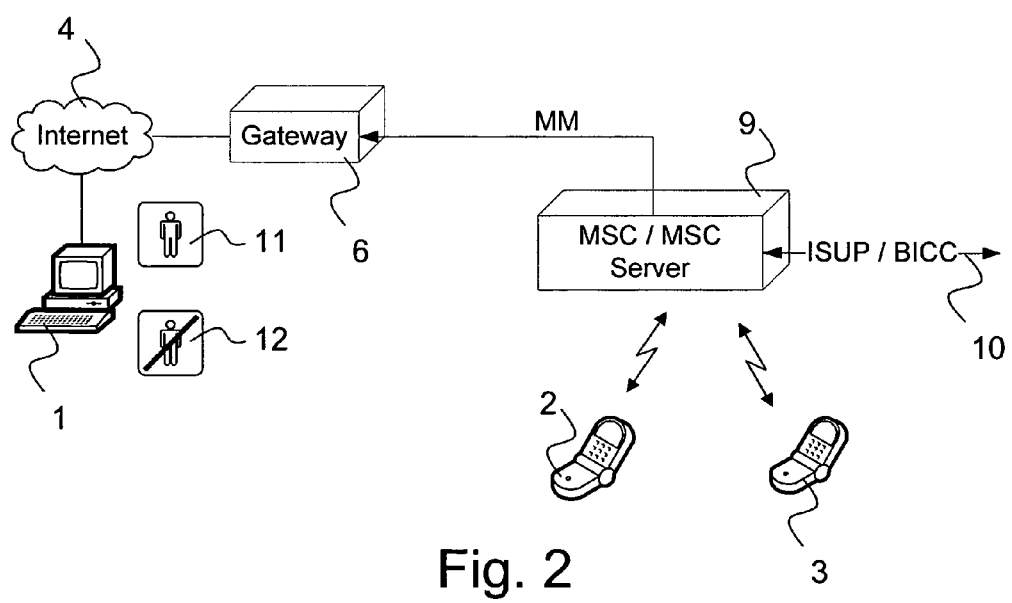
FIG. 2 shows, in a schematic manner, an example of status emulation of mobile communication user equipment for operation as a client in an internet communication environment, in the arrangement shown in FIG. 1.

Reference is made to FIG. 2. The communication gateway 6 receives Mobility Management (MM) notifications from the GSM network 5, i.e. from an MSC (Mobile Switching Centre) or MSC server 9, forming part of the GSM network 5. More specifically, the GSM network sends a notification when the mobile user switches on his/her mobile communication user equipment 2, 3 ('attach') and when the user switches off his/her mobile communication user equipment 2, 3 ('detach') or when the network detaches the user equipment 2, 3. The Mobility Management notifications contain MSISDN and IMSI (International Mobile Subscriber Identity) of the GSM mobile communication user equipment 2, 3. The MSC server 9 communicates with other parts of the network using ISUP and BICC (Bearer Independent Call Control) signalling, as schematically indicated by reference numeral 10.

As indicated above, the communication gateway 6 contains a binding between the emulated internet communication mobile client and its MSISDN. The Mobility Management notifications are used to set the status of the emulated client. When the user switches on the mobile communication user equipment 2, 3, the communication gateway 6 sets the internet communication status to 'logged in', e.g. John Smith' internet status symbol will appear unblocked or will turn green, for example, on other internet users' PC screen 1, as indicated by reference numeral 11. When the user switches off the mobile communication user equipment 2, 3, the user is detached by the network, and the communication gateway 6 sets the internet communication status to 'logged off', e.g. John Smith' internet status symbol will appear blocked or my turn red on other internet users' PC screen 1, as indicated by reference numeral 12.

The Mobility Management notifications are MAP messages; see 3GPP TS 23.078 v7.6.0, section 9. In FIG. 2, the mobility management event notification is sent from the MSC 9 to the communication gateway 6. 3GPP TS 23.078 specifies that the mobility management notifications are sent to gsm-SCF (GSM Service Control Function). The communication gateway 6 takes, in this architecture, the role of gsmSCF.

The mobility notifications sent to the communication gateway contain the GSM subscriber's location information, consisting of information elements such as Cell global identifier (Mobile country code, Mobile network code, Location area code, Cell identifier), Location number (e.g. representing a location according the local landline numbering plan) and geographical coordinates. The subscriber location, as reported to the communication gateway 6, may be used to augment the user icon in the internet communication environment 4 with a 'location qualifier'. The location qualifier could e.g. consist of a text string associated with the user icon, giving an indication of the country where the user currently resides.

For privacy reasons, the mobile communication user has to indicate, when becoming an internet communication user, whether the location information may be made visible to the internet communication community. The mobile user may also indicate to the communication gateway, when becoming an internet communication user, whether he/she wants his/her internet icon to reflect that he/she is a mobile subscriber, e.g. John_Smith_mobile, rather than a PC-bound internet communication user. The user preference is maintained in the communication gateway 6, as part of the user's profile.

The invention does not preclude that the mobility management notifications are sent to a mobility gateway, which distributes the notifications to those entities that have subscribed to the notifications, such as the communication gateway 6.

When someone operating as an internet communication user sets up an internet call to John_Smith, this call will be established towards the internet client in the communication gateway 6. That is to say, to the internet client associated with John Smith (the mobile user). The calling user will not know that John_Smith is in fact a GSM telephone, for example. The communication gateway 6 maintains binding between the internet client (John_Smith) and MSISDN (e.g. +31 65 161 3900).

Figure 3:
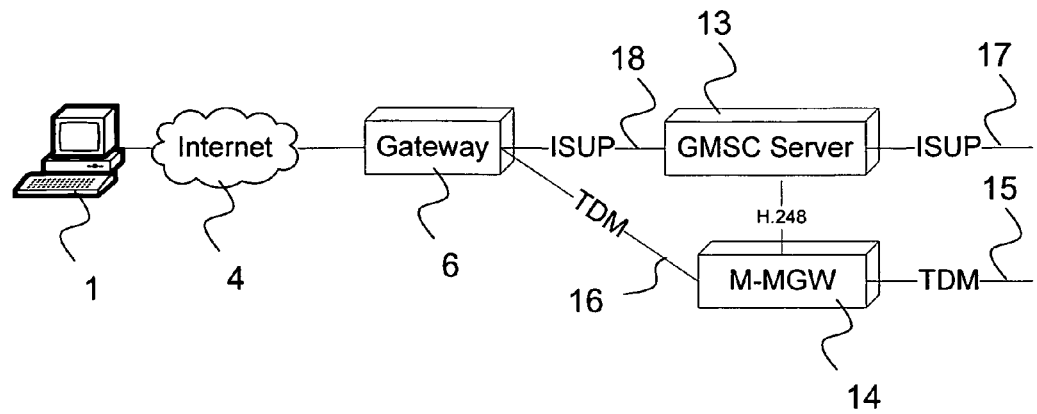
FIG. 3 shows, in a schematic manner, an example of signalling and media conversion in the arrangement shown in FIG. 1.

As schematically shown in FIG. 3, the internet gateway 6 routes the call to a GMS Core network server 13 (GSMC) in the GSM network 5 that the internet communication gateway 6 belongs to. In other words, the communication gateway 6 applies ISUP signalling towards the GMSC 13. The GMSC 13 applies regular call handling for delivering the call to the GSM subscriber. John_Smith will not have to know that the call originates from an internet caller.

It be emphasised that this method of calling is completely within the internet communication environment 4, not using any local access telephone numbers to contact users outside of the internet communication environment. The calling party applies regular internet communication methodology for calling John_Smith.

The communication gateway 6 converts also between IP based voice or video and Time Division Duplex (TDM) based voice or video, as is used in the GSM network 5. Reference numeral 14 refers to an Ericsson's Media Gateway for Mobile Networks (M-MGW), to provide video calls, for example. The M-MGW signalling to the network and the communication gateway is TDM, i.e. reference numerals 15 and 16, respectively. The GMSC server 13 uses ISUP signalling towards the network and the communication gateway, i.e. reference numerals 17 and 18, respectively.

It may not be desirable that a call that is established via the internet 4 and destined for an emulated mobile communication user is always delivered to the mobile communication user equipment 2, 3 of the mobile user. A GSM operator, for example, who offers the internet call delivery feature to its users may, for example, want to restrict the feature to home usage, i.e. usage in the home zone of the GSM network of the mobile user. In other words, the mobile communication user equipment 2, 3 may be marked as 'logged on' as an internet communication user only when he/she is in the home zone.

Such a restriction may be accomplished with UMA. See FIG. 4.

A Generic Access Network Controller (GANC) 19 facilitates that a GSM user with UMA capable user equipment 2 (supporting WLAN) accesses the GSM network through WLAN and public internet, e.g. a DSL connection at home. The GANC 19 may generate a notification when a user equipment registers with UMA. These notifications may be used to ensure that the communication gateway 6 marks the user equipment as 'logged on to internet communication' 11 only when that user equipment is connected to the GSM network through WLAN.

Instead of using UMA to determine whether a user is in his/her home zone, Femto Cell technology may be used for the GSM user, i.e. the mobile communication user equipment 3.

Figure 4:
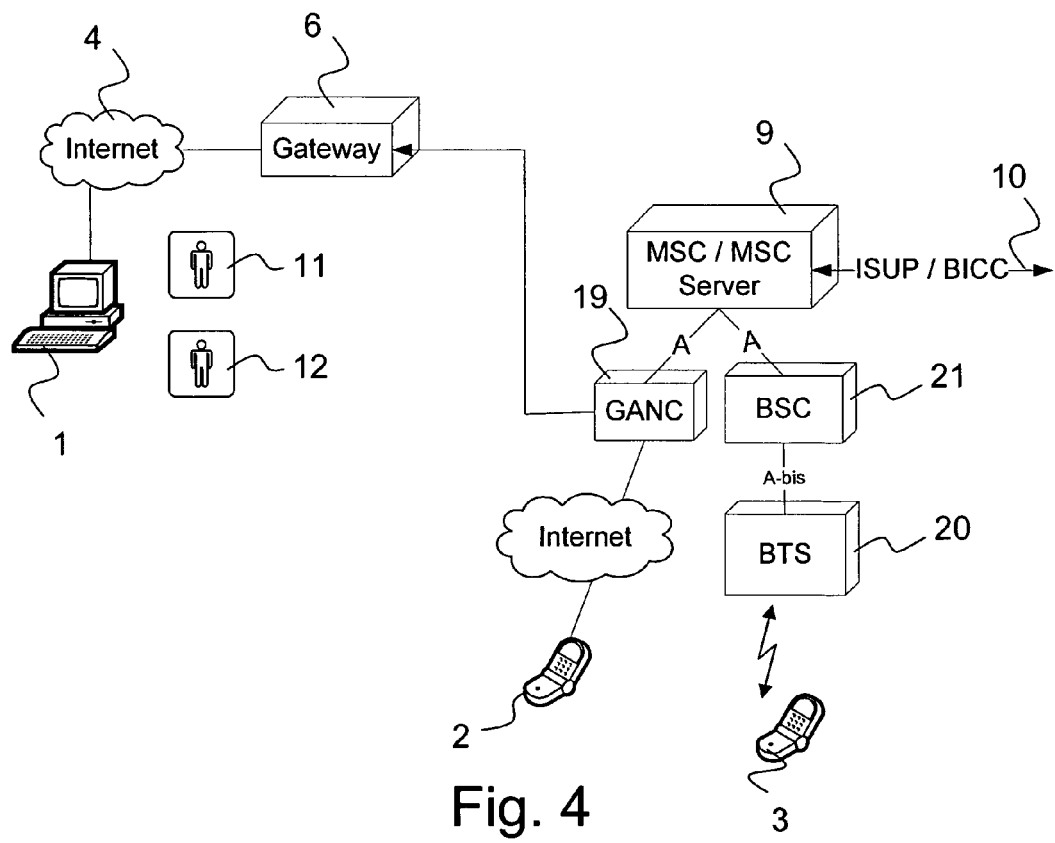
FIG. 4 shows, in a schematic manner, an example of UMA (Unlicensed Mobile Access) registration notifications in the arrangement shown in FIG. 1.

As shown in FIG. 4, a home zone may be allocated to a particular Base Transceiver Station (BTS) 20 which connects via a so-called A-bis interface to a Base Station Controller (BSC) 21 of the GSM network, i.e. the MSC or MSC server 9. When the mobile user equipment 3 is registered in a cell associated with BTS 20, i.e. the home zone, the mobile communication user equipment 3 may be marked as 'logged on' 11 in the internet communication environment 4, through the MSC or MSC server 9 and the BSC 21.

A home zone may include a Femto cell, which is smaller than a Pico cell. The BTS 20 may include a home access point.

In an embodiment of the invention, a call in which the mobile communication user equipment 2, 3 operates as a client in the internet communication environment 4 is charged to the mobile communication user equipment 2, 3.

Elaborating on the principle described above, the present invention may include the following enhancement. It was described above that the mobile communication user may want to be marked as 'active' 11 in the internet communication environment 4 only when he/she is registered in a particular area in the GSM network 5, e.g. registered in his/her home zone, registered through UMA or registered through a Femto cell. Rationale may be that when the mobile user equipment is registered in the home zone, terminating calls to that mobile user equipment will be (reverse) charged to the mobile user at a lower rate or may be free of charge.

Figure 5:
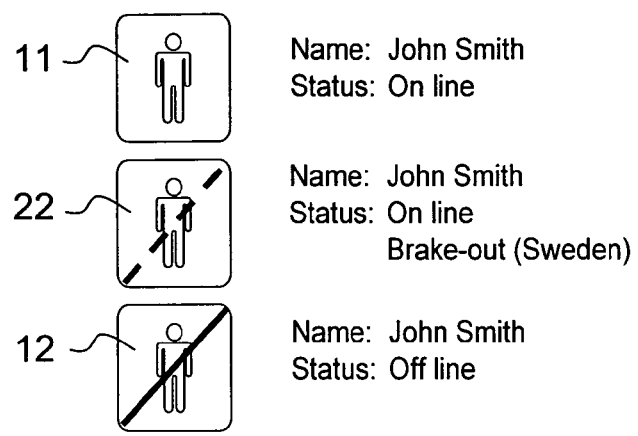
FIG. 5 shows, in a schematic manner, an example of differentiated on-line status representation, according to the invention.

When the mobile user is outside his/her designated home zone, he/she may remain contactable through the internet communication environment 4, however not as an emulated internet communication user. This may be reflected by the status icon of the mobile user in the internet communication environment 4, as depicted in FIG. 5.

The internet communication users will get an indication that John Smith can not be contacted as an emulated internet communication user by a dotted diagonal line in the status icon, for example, indicated by reference numeral 22. John Smith's GSM number is not shown. When an internet communication user decides to call John Smith, he or she may do so using a special service by which access to the GSM network 5 can be obtained, such as via a (local) breakout, as disclosed above. According to the invention, the communication gateway 6 may be arranged for establishing the call towards John Smith, however the call will be charged towards the internet communication user, using a payment mechanism in place for the above mentioned special service, for example. Those skilled in the art will appreciate that, for indicating an availability status of an emulated mobile communication subscriber, any other type of status icons may be used than the ones shown in FIG. 5.

Figure 6:
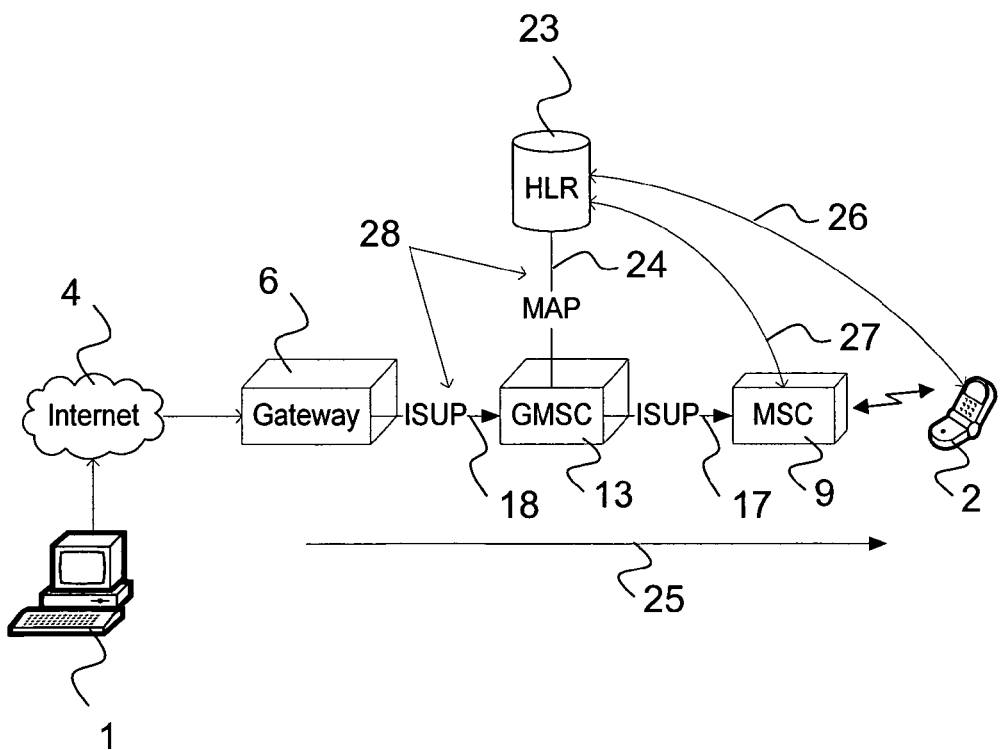
FIG. 6 shows, in a schematic manner, an example of calling name delivery with USSD (Unstructured Supplementary Service Data) in the arrangement shown in FIG. 1.

When an emulated mobile communication user equipment 2 receives a call when being called from the internet communication environment 4, there will not be a Calling Number available in the ISUP signalling flow 18, 17 towards the GMSC 13 and MSC 9. That is the regular GSM call delivery, as indicated by arrow 25 in FIG. 6. The present invention proposes that for these call cases, the Calling NAme Presentation (CNAP) feature be used instead. CNAP entails that the name of the calling party is presented to the called party. One of the common methods for CNAP is the transportation of the Calling Name through the ISUP signalling, more specifically, in the Initial Address Message (IAM). When the communication gateway 6 delivers a call to an emulated mobile communication user, the communication gateway 6 may use the internet communication name of the calling party as Calling Name.

This method will work only when the signalling system in the GSM network supports the transportation of the calling name. This is e.g. the case in North America.

Alternatively, if CNAP is not supported in the GSM network, the calling name of the internet caller may be delivered to the mobile communication user equipment 2, which operates as a client in the internet communication environment 4, by means of USSD, indicated by reference numeral 26. Hereto, the ISUP signalling 18 between the communication gateway 6 and the GMSC 13 as well as the MAP signalling 24 between the GMSC 13 and a Home Location Register (HLR) 23 of the GSM network, for call delivery, would need to have the capability to convey the calling name, schematically indicated by reference numeral 28. The HLR 23 may then transport the calling name to the called party (i.e. the mobile internet communication user) by means of USSD.

One way is that the called party initiates a USSD service after the call; the USSD service request will be sent to HLR 23, which returns the calling party' name, in this case the name of the calling internet communication user. For example:

User sends: *100#
HLR returns: "internet: Wendy_Jones"

The prefix "internet:" in the above example indicates to the called party that the calling party for this call had established the call from the internet communication environment. Instead of "Internet" as prefix, it is also possible to use the name of a particular internet communication service, for example.

An operator may want to adapt the charge for a terminating call when that call was established by an internet communication user, using the method according to the present invention as disclosed above, i.e. operating the mobile communication user equipment 2, 3 as a regular internet communication client.

Figure 7:
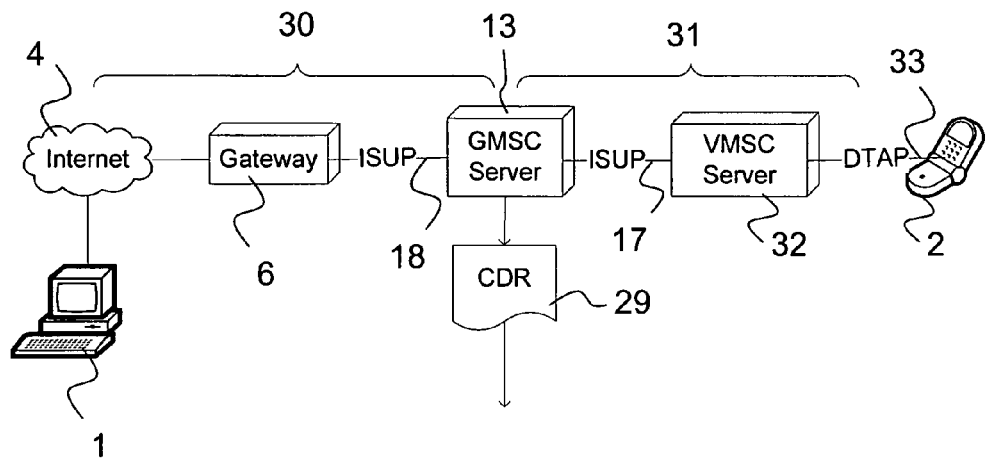
FIG. 7 shows, in a schematic manner, an example of charging for internet calls delivered to a mobile communication user, in the arrangement shown in FIG. 1.

In FIG. 7, the mobile communication user equipment 2 is shown attached (roamed) to a Visited Mobile Switching Centre 32 using Direct Transfer Application Part (DTAP) as the protocol for signalling, indicated by reference numeral 33. Call details, among which charging, are recorded in a Call Detail record (CDR) 29. Reference numeral 31 indicates a so-called roaming leg call, i.e. the part of the call that extends between the GMSC and the VMSC, which is to be paid by the mobile user. If the mobile user is in his/her home network, this part is usually free of charge.

For adapting the charging, the communication gateway 6 may use a designated Calling Party's Category (CPC) value in the ISUP Initial Address Message (IAM) sent to GMSC server 13, as illustrated in FIG. 7. The GMSC server 13 may invoke a CAMEL (Customised Application for Mobile network Enhanced Logic) service for terminating call handling; i.e. the CAMEL service is part of the charging system. The service invocation message from the GMSC server 13 to the CAMEL service includes the CPC, if available. The designated CPC value indicates to the CAMEL service (i.e. to the charging system) that the call is established from the internet communication environment 4 and that the call was established as a normal internet call. The charging system may then e.g. decide to:

apply call charge for receiving the call, even when in the home network;

apply call charge for receiving the call, even when in the home network, but not when the subscriber is in his/her home zone.

The CPC is defined in ITU-T recommendation Q.763, section 3.11. An operator may use one of the CPC values that are reserved for national use. When the call to the GSM user 2 is established as a call being charged to the internet user, according to the method described above, then the communication gateway 6 should use a different CPC value. The CPC value used in this case should indicate to the GMSC 13 in the GSM network that the call will be paid by the calling subscriber.

Figure 8:
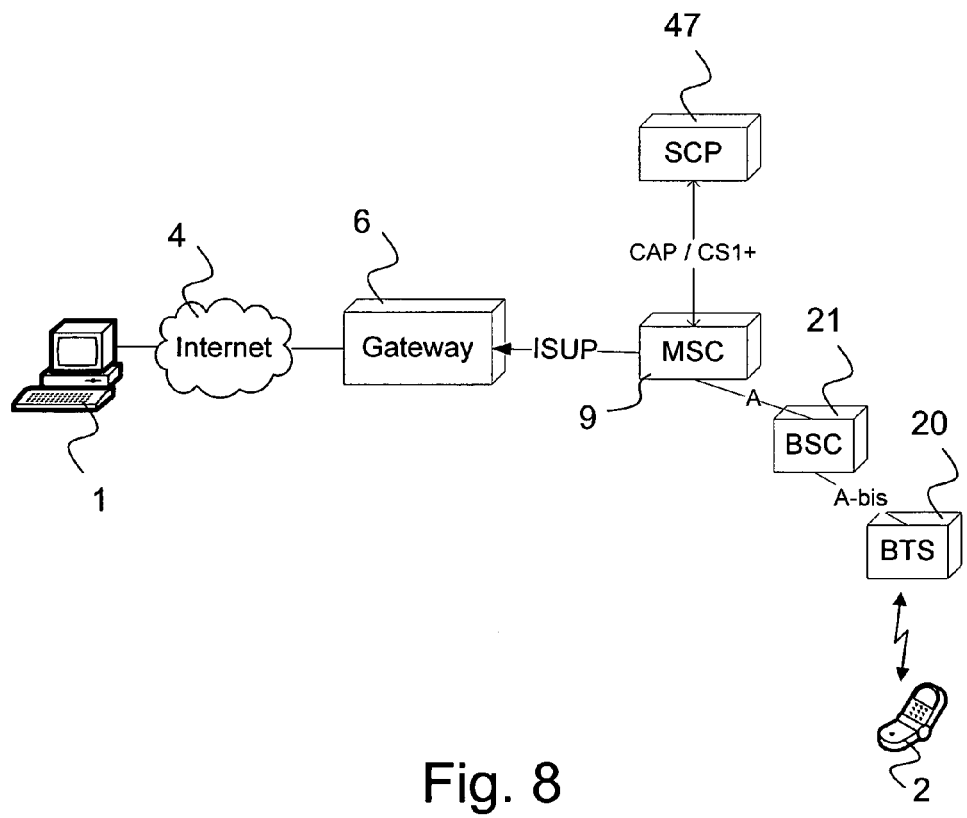
FIG. 8 shows, in a schematic manner, an example of calling an internet communication user from the mobile communication environment, in the arrangement shown in FIG. 1.

Mobile communication user equipment operating (emulated) as a client in the internet communication environment 4, in accordance with the invention, may want to establish a call to a regular internet communication user 1. The mobile user John Smith, known as John_Smith within the Internet communication environment 4, may want to call the regular internet communication user 1 Wendy Jones, known as Wendy_Jones within the internet communication environment. John Smith is using his GSM phone 2, for example, for establishing the call, but the call is delivered to Wendy Jones in the form of a regular internet type call. FIG. 8 schematically depicts this scenario, involving an SCP (Service Control Point) network node 47, which communicates to the MSC 9 via CAP or CS1+ signalling, as indicated in FIG. 8. Other standard or proprietary signalling may also be used between MSC 9 and SCP 47.

John Smith establishes a call to Wendy Jones by placing "Internet: Wendy_Jones" in the Called Party BCD (Binary Coded Decimal) Number. Instead of using a SIP URI (Session Initiation Protocol Uniform Resource Identifier) as called party BCD number, an internet communication URI is used. Placing the SIP URI in the called party BCD number (by the GSM telephone 2) is done with designated Numbering Plan Indicator (NPI). Likewise, the internet communication URI will also have a designated NPI value. See 3GPP TS 24.008 v5.12.0, section 10.5.4.7 for NPI values.

The MSC 9 will establish a (circuit switched) call to the communication gateway 6. The communication gateway 6 contains binding between John Smith' MSISDN and John Smith' internet name, as a result of the aforementioned provisioning of John Smith in the communication gateway 6. Hence, the communication gateway can emulate an internet call from John_Smith towards Wendy_Jones.

The following methods may be applied for routing a call destined for 'Internet: Wendy_Jones' to the communication gateway 6:

(1) The MSC 9 applies switch-based routing; this entails that the MSC 9 is configured to route calls that are destined for NPI=internet to the communication gateway, i.e. select an ISUP route towards the communication gateway 6. The MSC 9 will copy the address contained in the called party BCD number to the called party number. Also, the NPI in the called party number will be set to a designated, national-specific value, to indicate that the called party number contains an internet identifier instead of a "normal" number. This method requires that the called party number in ISUP IAM shall be able to contain sufficient digits to carry to the internet URI.

(2) The MSC 9 applies switched-based routing to the internet gateway 6. Instead of placing the internet URI in the called party number, the internet URI is placed in another parameter in the ISUP IAM, like e.g. User-to-User information element. A CAMEL service may be used for routing the call to the communication gateway 6. however, this is not preferred if the CAMEL service should remain available for prepaid. The call to an internet user should be charged as local call. Being able to enter an internet communication URI on the GSM telephone, however, may require special application to be downloaded in the phone.

A GSM operator, for example, may wish to prevent communication from one mobile communication user equipment 2 operating as a client in the internet communication environment 4 to another mobile communication user equipment 3 operating as a client in the internet communication environment 4, according to the present invention. The GSM operator, hereto, takes measures to ensure that the call from one mobile communication user equipment 2 operating as a client in the internet communication environment 4 to the other mobile communication user equipment 3 operating as a client in the internet communication environment 4, is not routed through the internet communication environment 4, but is handled internal in the GSM network. This may be accomplished, for example, in the communication gateway 6 or in the MSC 9 of the mobile communication user equipment 2, 3. Instead of routing the calls via the communication gateway 6, calls between the mobile communication user equipment 2, 3 will be routed according to the normal GSM routing procedures, for example.

Figure 9:
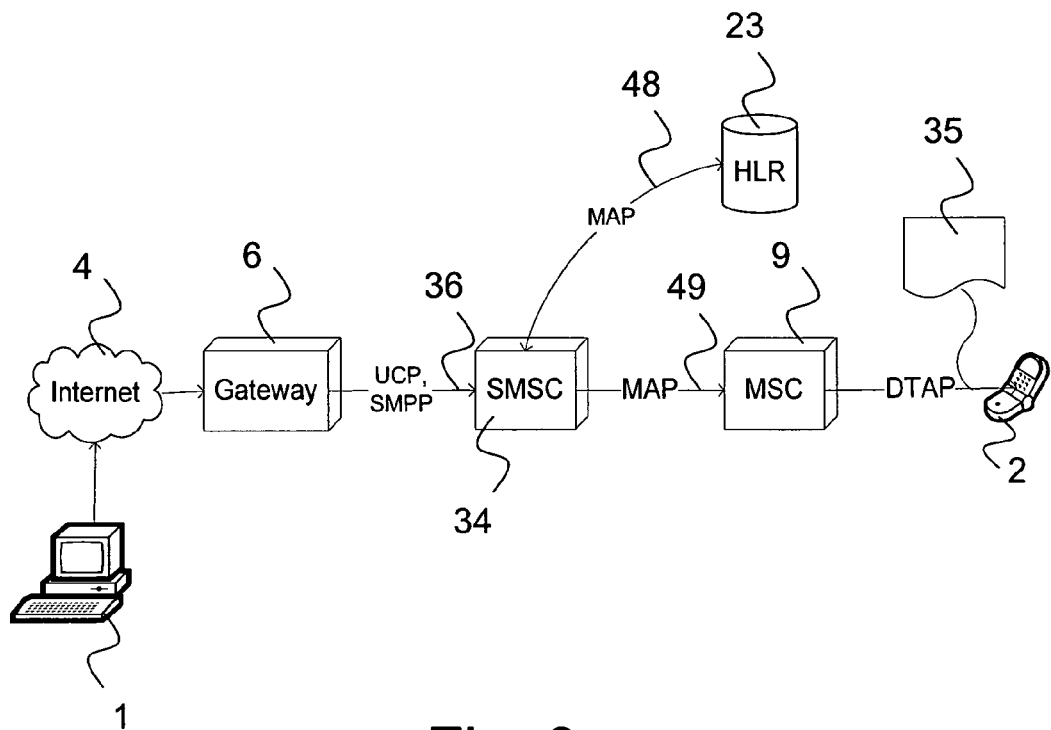
FIG. 9 shows, in a schematic manner, an example of text message transfer to mobile communication user equipment operating as an internet communication user in accordance with the invention, in the arrangement shown in FIG. 1.

With reference to FIG. 9, messaging for the mobile communication user equipment 2, 3 operated as a client in the internet communication environment 4 can be supported as follows. An arbitrary internet communication user equipment 1 may send a text message 35 to the mobile internet user equipment 2, 3. The communication gateway 6 converts the message to a message format that is suitable for text transfer in the GSM network, i.e. Short Message Service Centre (SMSC) 34, MSC 9 and HLR 23, involving MAP signalling 48 and 49.

FIG. 9 shows that the message that originates from the internet user 1 is submitted to the SMSC 34; the MSISDN of the emulated mobile communication user equipment, which is known in the communication gateway 6, is used to address the mobile communication user equipment 2. The signalling and communication protocol used for the message transfer between the communication gateway 6 and the SMSC 34 may be any of the commonly used protocols for submitting a message from internet applications to an SMSC 34. Examples include, but are not limited to, UCP (Universal Computer Protocol) and Short Message Peer to Peer (SMPP), as indicated by reference numeral 36. The SMSC 34 takes care of delivering the message to the mobile communication user equipment 2, in the form of an SMS. The delivery of the SMS to the mobile communication user equipment 2 is done through standard MAP signalling 49.

SMS delivery according to the invention includes store-and-forward. When an SMS destined for an emulated mobile internet communication user can't be delivered to the mobile communication user equipment, the SMSC 34 stores the message and will attempt to deliver the SMS at a later moment. The period for which the message is stored for deferred delivery (known as 'Validity Period') may be set by the sender of the message. The arbitrary internet user 1 may, when sending a message to the mobile internet communication user, indicate the desired validity period for the message. If e.g. the validity period is set to 0, the SMSC 34 will attempt to deliver the message but will not re-attempt delivery in the case that the first delivery attempt fails.

The SMSC 9 may be owned and operated by the internet communication environment 4. Alternatively, the internet communication environment operator may have an agreement with one or more GSM network operators, e.g. one GSM operator in each country, for delivering the messages through these GSM operators' SMSCs.

Figure 10:
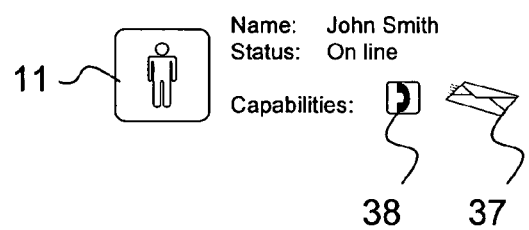
FIG. 10 shows, in a schematic manner, an example of enhanced status representation, according to the invention, including messaging capability.

FIG. 10 shows how the mobile internet user's icon may be enhanced to indicate that one may send a message to that user. An envelope picture 37 indicates that (besides internet calling that user) messages may be sent to that user. Of course other pictures or symbols may be used. The telephone receiver picture 38 generally indicates that calls may be established with the mobile internet communication user.

A further refinement to the capability of sending messages to the mobile internet communication user is the following. The capability of sending a message to the mobile internet communication user may be made dependent on the location of the mobile internet communication user.

Referring to the description above, where the capability to place an internet call to the mobile internet user is dependent on the location of the mobile internet communication user. For example, sending a message to the mobile internet user is possible only when the mobile internet user is located in his/her home zone. The mobility notifications described earlier indicate whether the mobile internet user is in his/her home zone. If the mobile internet user is not in his/her home zone, then the envelope 37, see FIG. 10, is not displayed. Alternatively, when the mobile internet user is not in his/her home zone, then the sending of messages to that user is not prohibited, but the message sender will be charged for sending the message. The envelope icon 37 may in this case be modified, e.g. shown in a different colour, to inform the sender of a message that a charge will be applicable for sending the message.

Figure 11:
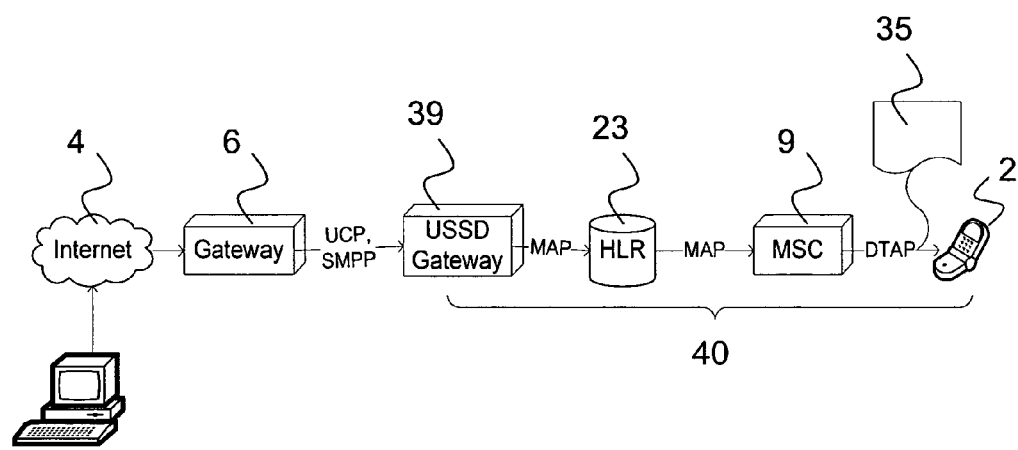
FIG. 11 shows, in a schematic manner, an example of text message transfer to mobile communication user equipment operating as an internet communication user in accordance with the invention, using USSD in the arrangement shown in FIG. 1.

As reflected in FIG. 11, an alternative method for delivering the text message to the mobile internet communication user 2 is the use of Unstructured Supplementary Service Data (USSD). Hereto, the communication gateway 6 would send the text message to a USSD gateway 39. FIG. 11 shows UCP and SMPP as possible protocols between communication gateway 6 and USSD gateway 39. Alternatively, MAP or another suitable protocol could be used between communication gateway 6 and USSD gateway 39. USSD does not have the store-and-forward principle. Hence, if the mobile internet communication user's phone 2 is not switched on, the message will not be delivered. Reference numeral 40 indicates forwarding of the USSD message to the mobile communication user equipment 2.

USSD Gateway 39 and HLR 23 are normally owned and operated by the same operator. Hence, the internet communication operator would need agreement with operator(s) for text message delivery through USSD.

Message sending towards the mobile internet communication user 2 is, in a further embodiment of the invention, enhanced as follows. When a mobile communication user equipment 2 operating as a client in the internet communication environment 4 sends a message to another mobile communication user equipment 2 operating as a client in the internet communication environment 4, then the message will not traverse the internet communication environment 4. Instead, the message transfer will be handled in the GSM network. This may be accomplished, for example, in the communication gateway 6 or in the MSC 9 of the mobile communication user equipment 2, 3, upon detecting that the destination of the SMS is a mobile communication user equipment 2 operating as a client in the internet communication environment 4.

Figure 12:
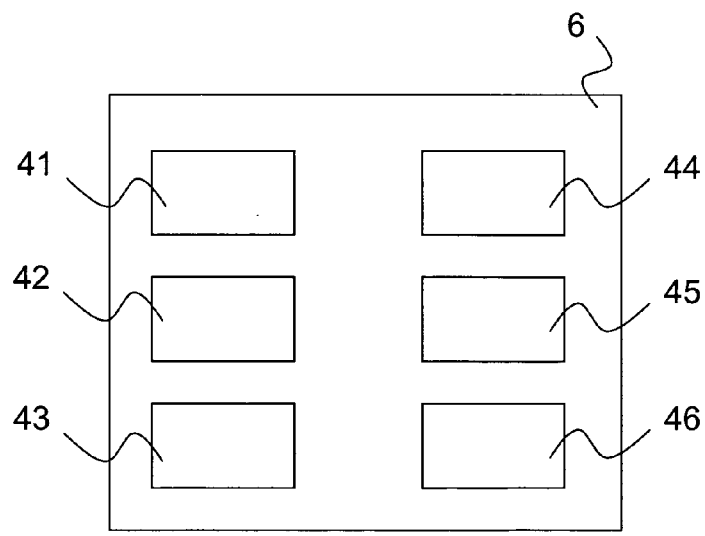
FIG. 12 shows, in a schematic manner, components of an example of a communication gateway according to the present invention.

FIG. 12 shows a general overview of an example of components forming the communication gateway 6 according to the present invention.

Reference numeral 41 designates emulation equipment for emulating the mobile communication user equipment as a client in the internet communication environment. Status representation equipment 42 represents a status of the mobile communication user equipment in the internet communication environment, call establishing equipment 43 provides for establishment of calls with the mobile communication user equipment as a client in the internet communication environment. User provisioning equipment 44 provides the mobile communication user equipment with an internet communication identity adapted for identification in the internet communication environment and for binding the internet communication identity to a mobile communication identity of the mobile communication user equipment for identification in the mobile communication environment.

Storage equipment 45 is provided, for storing information as to the status representation of the user equipment in a mobile communication user equipment profile. Preferably, the mobile communication user may, at all times, have access to the user profile for adapting the user profile for operation as a client in the internet communication environment.

Reference numeral 46 refers to equipment for handling message and/or picture calls and the like as disclosed above.

Some or all of the components 41, 42, 43, 44 and 46 of the communication gateway 6 may be arranged as a computer program executed in a computer comprised by the gateway 6.

The communication gateway may form part of or may be operated, controlled or owned by the network operator of the mobile communication environment. Alternatively, the communication gateway may form part of or may be operated, controlled or owned by the operator or service provider of the internet communication environment.

The invention is not limited to the embodiments disclosed above. Those skilled in the art will appreciate that some of the functionality performed by the components disclosed above may be implemented by hardware or software using suitably programmed processing equipment or a combination of hardware and software.

The invention claimed is:

1. A method of call establishment between internet communication user equipment operating in an internet communication environment, and mobile communication user equipment operating in a mobile communication environment, said method comprising:
   emulating said mobile communication user equipment as a client to act on behalf of the mobile communication user equipment in said internet communication environment;
   representing an emulation status of the mobile communication user equipment in said internet communication environment;
   establishing a call with said mobile communication user equipment as a client in said internet communication environment,
   providing said mobile communication user equipment with an internet communication identity adapted for identification in said internet communication environment; and
   binding said internet communication identity to a mobile communication identity of said mobile communication user equipment for identification in said mobile communication environment.

2. The method of claim 1, wherein call establishment is enabled if a call setup request from said mobile communication user equipment operating as a client in said mobile communication environment comprises an identity of internet communication user equipment.

3. The method of claim 1, wherein a call in which said mobile communication user equipment operates as a client in said internet communication environment is charged to said mobile communication user equipment.

4. The method of claim 1, wherein said mobile communication user equipment receives an indication of a call setup request from user equipment operating as a client in said internet communication environment.

5. The method of claim 1, wherein said internet communication environment is a Voice over Internet Protocol communication environment.

6. The method of claim 1, wherein said mobile communication environment is any of a group comprised by a GSM communication environment, a UMTS communication environment, and a wireless data-protocol environment.

7. The method of claim 1, wherein said status representation comprises an indication that said user equipment is the mobile communication user equipment.

8. The method of claim 1, wherein said status representation comprises call availability representation of said mobile communication user equipment in said mobile communication environment.

9. The method of claim 1, wherein said status representation comprises geographical location information of said mobile communication user equipment in said mobile communication environment.

10. The method of claim 1, wherein said status representation is selectively adaptable contained in a mobile communication user equipment profile.

11. The method of claim 1, wherein said call establishment is dependent on mobile communication user equipment location.

12. The method of claim 1, wherein call establishment is disabled if a call setup request from said mobile communication user equipment operating as a client in said internet communication environment comprises an identity of another mobile communication user equipment operating as a client in said internet communication environment.

13. The method of claim 1, wherein message calls from internet communication user equipment to said mobile communication user equipment operating as a client in said internet communication environment are delivered following a store-and-forward scheme.

14. An arrangement for call establishment between internet communication user equipment operating in an internet communication environment and mobile communication user equipment operating in a mobile communication environment, the arrangement comprising:
   emulation equipment for emulating said mobile communication user equipment as a client to act on behalf of the mobile communication user equipment in said internet communication environment;

representation equipment for representing an emulation status of said mobile communication user equipment in said internet communication environment;

call establishing equipment for establishing calls with said mobile communication user equipment as a client in said internet communication environment; and user provisioning equipment for providing said mobile communication user equipment an internet communication identity adapted for identification in said internet communication environment, and for binding said internet communication identity to a mobile communication identity of said mobile communication user equipment for identification in said mobile communication environment.

15. The arrangement of claim 14, wherein said status representation equipment is arranged for visually representing said status on a display of said internet communication user equipment.

16. The arrangement of claim 14, wherein said status representation equipment is arranged for providing in said internet communication environment:

an indication that said user equipment is a mobile communication user equipment;

call availability of said mobile communication user equipment in said mobile communication environment;

messaging capability of said mobile communication user equipment in said mobile communication environment;

geographical location information of said mobile communication user equipment in said mobile communication environment; and cost indication, in the case that establishing a call to said mobile communication user equipment operating as a client in said mobile communication environment would incur costs for said internet communication user.

17. The arrangement of claim 14, wherein said call establishing equipment is arranged for call establishment dependent on at least one of:

mobile communication user equipment location information; and internet communication identity of user equipment operating as a client in said internet communication environment.

18. The arrangement of claim 14, wherein said call establishing equipment further comprises equipment handling message calls from user equipment operated as a client in said internet communication environment to mobile communication user equipment operating as a client in said internet communication environment following a store-and-forward scheme.

19. A communication gateway equipped for exchanging communication data and signaling data between an internet communication environment and a mobile communication environment, said communication gateway comprising:

status representation equipment for representing an emulation status of said mobile communication user equipment in said internet communication environment;

emulation equipment for emulating mobile communication user equipment as a client to act on behalf of the mobile communication user equipment in said internet communication environment;

call establishing equipment for establishing calls with said mobile communication user equipment as a client in said internet communication environment; and user provisioning equipment for providing said mobile communication user equipment with an internet communication identity adapted for identification in said internet communication environment, and for binding said internet communication identity to a mobile communication identity of said mobile communication user equipment for identification in said mobile communication environment.

20. The communication gateway of claim 19, comprising storage equipment for storing a mobile communication user equipment profile comprising information as to said status representation of said mobile communication user equipment in said mobile communication environment.

21. The communication gateway of claim 19, comprising equipment for handling message calls, picture calls, or both.

22. A user equipment arranged for establishing calls with an internet communication environment, wherein said user equipment comprises a receiver and a display arranged for receiving and displaying status representation of mobile communication user equipment operating as a client to act on behalf of the mobile communication user equipment in the internet communication environment, said mobile communication user equipment being provided with an internet communication identity adapted for identification in said internet communication environment, and said internet communication identity being binded to a mobile communication identity of said mobile communication user equipment for identification in said mobile communication environment.

* * * * *

UNITED STATES PATENT AND TRADEMARK OFFICE
CERTIFICATE OF CORRECTION

| | | |
|---|---|---|
| PATENT NO. | : 8,811,276 B2 | Page 1 of 1 |
| APPLICATION NO. | : 12/747897 | |
| DATED | : August 19, 2014 | |
| INVENTOR(S) | : Noldus | |

It is certified that error appears in the above-identified patent and that said Letters Patent is hereby corrected as shown below:

On the Title Page, in Item (57), under "ABSTRACT", in Column 2, Line 2, delete "dient" and insert -- client --, therefor.

On the Title Page, in Item (57), under "ABSTRACT", in Column 2, Line 4, delete "dient" and insert -- client --, therefor.

On the Title Page, in Item (57), under "ABSTRACT", in Column 2, Line 6, delete "dient" and insert -- client --, therefor.

On the Title Page, in Item (57), under "ABSTRACT", in Column 2, Line 10, delete "dient" and insert -- client --, therefor.

Specification

In Column 16, Line 9, delete "SMSC 9" and insert -- SMSC 34 --, therefor.

Claims

In Column 17, Line 67, in Claim 1, delete "environment," and insert -- environment; --, therefor.

Signed and Sealed this
Eighth Day of March, 2016

Michelle K. Lee
*Director of the United States Patent and Trademark Office*